United States Patent [19]

Clough et al.

[11] Patent Number: 4,946,578
[45] Date of Patent: Aug. 7, 1990

[54] PROCESS FOR TREATING HYDROCARBONS

[75] Inventors: Thomas J. Clough, Santa Monica; John W. Sibert, Malibu, both of Calif.

[73] Assignee: Ensci, Inc., Woodland Hills, Calif.

[21] Appl. No.: 361,709

[22] Filed: May 25, 1989

Related U.S. Application Data

[63] Continuation of Ser. No. 225,732, Jul. 29, 1988, abandoned, which is a continuation-in-part of Ser. No. 931,246, Nov. 17, 1986, abandoned.

[51] Int. Cl.$^5$ .............................................. C10G 27/00
[52] U.S. Cl. ..................................... 208/46; 208/244; 208/249; 208/295; 44/15 R
[58] Field of Search ................. 208/295, 244, 249, 46; 44/15 R, 253

[56] References Cited

U.S. PATENT DOCUMENTS

| | | | |
|---|---|---|---|
| 4,022,588 | 5/1977 | Dessau | 208/249 |
| 4,040,484 | 8/1987 | Hessert | 166/270 |
| 4,158,548 | 6/1979 | Burk et al. | 208/249 |
| 4,314,902 | 2/1982 | Bouk | 208/295 |
| 4,552,217 | 11/1985 | Wu et al. | 166/270 |
| 4,581,131 | 4/1986 | Rudnick | 208/285 |
| 4,752,379 | 6/1988 | Delaney | 208/253 |

FOREIGN PATENT DOCUMENTS

| | | | |
|---|---|---|---|
| 1470471 | 3/1969 | Fed. Rep. of Germany | 208/244 |
| 4811321 | 2/1967 | Japan | 208/244 |
| 1141746 | 1/1969 | United Kingdom | 208/249 |

Primary Examiner—Asok Pal
Attorney, Agent, or Firm—Frank J. Uxa, Jr.

[57] ABSTRACT

A process for chemically modifying at least one component of a hydrocarbon-based material comprising: contacting the hydrocarbon-based material with at least one metal component selected from the group consisting of vanadium components in which vanadium is present in the 5+ oxidation state in an amount effective to promote the chemical modification of at least one component of the hydrocarbon-based material, iron components in which iron is present in the 3+ oxidation state in an amount effective to promote the chemical modification of at least one component of the hydrocarbon-based material, managanese components in which manganese is present in the 3+ oxidation state in an amount effective to promote the chemical modification of at least one component of the hydrocarbon-based material and mixtures thereof, and at least one oxygen transfer agent in an amount effective to do at least one of the following: maintain at least partially the promoting activity of the metal component; produce at least a portion of metal component; and oxidize at least a portion of the component of the hydrocarbon-based material, the contacting occurring at conditions effective to chemically modify the component of the hydrocarbon-based material.

49 Claims, No Drawings

PROCESS FOR TREATING HYDROCARBONS

This application is a continuation of application Ser. No. 225,732, filed July 29, 1988, now abandoned, which in turn is a continuation-in-part of application 931,246, filed Nov. 17, 1986, now abandoned.

BACKGROUND OF THE INVENTION

This invention relates to a process for treating hydrocarbon-based materials, such as petroleum and petroleum fractions. More particularly, the invention relates to processes wherein one or more components of such materials are oxidized and/or otherwise chemically modified.

Petroleum and petroleum fractions are important fuels, and large amounts are burned. One of the principal drawbacks of the use of these materials as fuel is that many such materials contain amounts of sulfur and other components which generate unacceptable amounts of pollutants, e.g., sulfur oxides, on burning.

It would be clearly advantageous to provide a process to desulfurize such fuels and/or otherwise treat such fuels to reduce the above-noted pollution concerns. For example, other than desulfurization, petroleum and petroleum fractions may be cracked to lower boiling components which are often more effectively combusted and result in reduced emission of potential pollutants. Also, petroleum and petroleum fractions may be demetallized and/or otherwise treated so that the resulting material is more amenable to being economically processed, e.g., upgraded to higher quality products.

SUMMARY OF THE INVENTION

A new process for chemically modifying, preferably chemically reacting or chemically converting, at least one component of a hydrocarbon-based material has been discovered. This process provides an effective, convenient and economical approach to chemically modifying, more preferably oxidizing, cracking, demetallizing, forming surfactants from, or altering the viscosity of or the like, one or more components of a hydrocarbon-based material, preferably petroleum.

One broad aspect of the present invention comprises contacting the hydrocarbon-based material with at least one oxygen transfer agent, preferably a reducible manganese component, and at least one vanadium component and/or at least one iron component and/or manganese component at conditions effective to chemically modify, preferably oxidize, crack, demetallize, form surfactants from, or alter the viscosity or the like, at least one component of the hydrocarbon based material. Vanadium is present in the 4+ and/or 5+ oxidation states, preferably in the 5+ oxidation state, in an amount effective to promote the chemical modification of the component. Iron is present in an amount in the 3+ oxidation state effective to promote the chemical modification of the component. Manganese is present in an amount in the 3+ oxidation state effective to promote the chemical modification of the component. The vanadium component and/or the iron component and/or manganese component is preferably substantially soluble at the conditions of use. The oxygen transfer agent is present during the contacting in an amount effective to do at least one of the following: maintain at least partially the promoting activity of the vanadium component and/or iron component; produce at least a portion of the vanadium component and/or iron component and/or manganese component; and oxidize at least a portion of the component of the hydrocarbon-based material.

In another broad aspect, the present process comprises contacting a hydrocarbon-based material with at least one petroleum hydrocarbon material. manganese (3+) cyclable ligand complex in which manganese is present in the 3+ oxidation state in an amount effective to promote the chemical modification of at least one component of the hydrocarbon-based material, preferably with an oxidant, at conditions effective to chemically modify one or more of such components.

The present process advantageously results in the chemical modification of one or more components of the hydrocarbon-based material. Such chemical modification, as described herein, of such component or components often results in enhanced value of the resulting hydrocarbon-based product and/or produces a treated hydrocarbon-based material which can be further processed, e.g., to yield high quality products, more effectively than the original or untreated hydrocarbon material. The present invention can provide a cost effective approach to providing high quality and high value hydrocarbon- based products.

DETAILED DESCRIPTION OF THE INVENTION

The present process is effective for treating hydrocarbon-based materials. Any suitable hydrocarbon-based material may be treated in the present process. Such materials include organic sulfur, in particular, non-thiophenic sulfur. Such hydrocarbon-based materials may also include one or more metallic or metal-containing components which can beneficially be removed, e.g., to render the resulting demetallized hydrocarbon-based material more amenable to further processing. Examples of hydrocarbon-based materials which may be processed in accordance with the present invention include whole petroleums (crude oils including topped crude oils), petroleum residua (both vacuum and, preferably, atmospheric residua), gas oils, middle distillates, naphthas, and the like and mixtures thereof. The present process is particularly applicable to heavy feedstocks, such as those selected from the group consisting of whole petroleums, petroleum residua and mixtures thereof. Because the present process is particularly effective in removing non-thiophenic sulfur, the material used is preferably not subjected to conditions prior to the contacting which are effective to increase the amount of thiophenic sulfur present in the material. Such conditions, which often act to rearrange the sulfur-containing components in the material to thiophenic sulfur-containing components, may include temperatures of at least about 800° F. or at least about 1000°F. or more.

In one embodiment of the invention, the process comprises: contacting the hydrocarbon-based material with at least one of the following: (1) at least one of certain vanadium and/or iron and/or manganese components present in an amount effective to promote the chemical modification of at least one component of the hydrocarbon-based material and at least one oxygen transfer agent; and/or (2) at least one manganese (3+) ligand complex in an amount effective to promote such chemical modification, and preferably at least one oxidant. A hydrocarbon-based product having at least one improved property relative to the hydrocarbon-based material is recovered.

The present process has been found to provide for the chemical modification of hydrocarbon-based materials, e.g., crude petroleum, to provide high quality and high value products, preferably in high yields. For example, the vanadium components, iron components, manganese components, oxygen transfer agents, and oxidants, e.g., as described herein, which may be employed are relatively inexpensive, readily available and/or easy to produce.

The term "chemical modification" as used herein refers to a change in one or more of the components of the hydrocarbonbased material, which change preferably results from the chemical reaction, more preferably oxidation, cracking or demetallization, of one or more of such components. In certain instances, no specific chemical reaction can be pointed to account for the change in the component or components. Also, the chemical modification may occur with regard to the carbon and/or hydrogen portions of the hydrocarbon-based material and/or to the other portions, e.g.. such as contained sulfur, nitrogen, oxygen, metals or the like, of such hydrocarbon-based materials.

One embodiment the present process involves contacting a hydrocarbon-based material with at least one metal component selected from vanadium components, iron components, manganese components and mixtures thereof, and at least one oxygen transfer agent. The vanadium component is such that vanadium is present in the $4+$ and/or $5+$ oxidation states, preferably in the $5+$ oxidation state, in an amount effective to promote the chemical modification of at least one component of the hydrocarbon-based material. The iron component is such that the iron is present in the $3+$ oxidation state in an amount effective to promote the chemical modification of at least one component of the hydrocarbon-based material. The manganese component is such that the manganese is present, preferably in the $3+$ oxidation state, in an amount effective to promote the chemical modification of at least one component of the hydrocarbon-based material. The oxygen transfer agent is present in an amount effective to do at least one of the following: maintain at least partially the promoting activity of the metal component; produce at least a portion of the metal component; and oxidize at least a portion of the component of the hydrocarbon-based material.

Such contacting may occur over a wide pH range, e.g., about 1 or less to about 13 or more, preferably at a slightly acidic pH, i.e., a pH no lower than about 6, or at an alkaline pH. If vanadium is present, the contacting is more preferably conducted at a pH in the range of about 6 to about 13, while if the iron component is present, the pH is more preferably about 6.5 to about 9.5. If manganese $3+$ is present, the pH is more preferably about 7.5 to about 10.5. These more preferred pH ranges are particularly useful when it is desired to maintain the metal component substantially soluble, e.g., in the liquid medium used to carry the metal component or components and/or the oxygen transfer agent to the contacting, at the contacting conditions.

The vanadium component or components useful in the present invention may be chosen from any such components which function as described herein. Examples of useful components include vanadium pentoxide, soluble vanadates and oxyanion derivatives thereof, complexes of vanadium with ligands and other compounds in which vanadium is present in the $5+$ oxidation state. Preferably, the vanadium component or components are capable of being reduced to a lower oxidation state, e.g., to oxidize at least one component of the hydrocarbon-based material and of being oxidized to the $5+$ oxidation state by the oxygen transfer agent at the contacting conditions. In one embodiment, the vanadium component or components are preferably substantially soluble in the above-noted liquid medium at the contacting conditions. A particularly useful embodiment involves one or more vanadium $(5+)$ complexes with ligands, which complexes, as well as the corresponding reduced forms during the time prior to reoxidation, are more preferably substantially soluble in the liquid medium at the contacting conditions.

The iron component or components useful in the present invention may be chosen from any such components which function as described herein. Preferably, the iron component or components are capable of being reduced to a lower oxidation state, e.g., to oxidize at least one component of the hydrocarbon-based material, and of being oxidized to the $3+$ oxidation state by the oxygen transfer agent at the contacting conditions. In certain embodiments, the iron component or components are preferably substantially soluble in the liquid medium at contacting conditions. A particularly useful embodiment involves iron $(3+)$ complexes with ligands, which complexes, as well as the corresponding reduced forms during the time prior to reoxidation, are more preferably substantially soluble in the liquid medium at the contacting conditions.

The manganese component or components useful in the present invention may be chosen from any such components which function as described herein. Preferably, the manganese component or components are capable of being reduced to a lower oxidation state, e.g., to oxidize at least one component of the hydrocarbon-based material, and of being oxidized to the $3+$ oxidation state by the oxygen transfer agent at the contacting conditions. In certain embodiments, the manganese components or components are preferably substantially soluble in the liquid medium at contacting conditions. A particularly useful embodiment involves manganese $(3+)$ complexes with ligands, which complexes, as well as the corresponding reduced forms during the time prior to reoxidation, are more preferably substantially soluble in the liquid medium at the contacting conditions.

The oxygen transfer agent or agents may be chosen from any suitable materials capable of functioning as described herein. In certain instances, non-metal containing materials, such as molecular oxygen, may be employed. The oxygen transfer agent preferably includes at least one metal species which is capable of being reduced, e.g., to oxidize the vanadium or iron components, at the conditions of the present contacting. More preferably, the reduced oxygen transfer agent is also capable of being oxidized to the oxygen transfer agent at the present contacting conditions, although one time (e.g., once through) use of the oxygen transfer agent or reoxidation of the reduced oxygen transfer agent to the oxygen transfer agent external or separately from the present contacting can also be practiced. The oxygen transfer agent preferably includes at least one oxygen species. In one particularly useful embodiment, the oxygen transfer agent comprises a reducible, redox cyclable manganese component.

By "reducible manganese component" or "RMC" is meant a manganese component which is capable of being chemically reduced at the conditions of the present contacting. Preferably, the RMC includes manganese, more preferably a major amount of manganese, in at least one of the 3+ and 4+ oxidation states. Particularly useful RMCs include manganese dioxide, i.e., $MnO_2$, soluble manganese in the (3+) oxidation state and mixtures thereof. The RMC can be provided from any suitable source, such as manganese halide and the like. The manganese component originally present may be subjected to oxidation, e.g., by contact with air and/or other manganese oxidant in the presence of base, in order to obtain and/or regenerate the presently useful RMC. The amount of RMC employed may vary over a wide range depending on, for example, the specific RMC being employed, what, if any, oxidant is being used, the specific hydrocarbon-based material being treated, and the type and degree of chemical modification desired. Preferably, the amount of RMC included in the present contacting step is sufficient to maintain the desired amount of vanadium in the 5+ oxidation state or the desired amount of iron in the 3+ oxidation state during the contacting. Substantial excesses of RMC should be avoided since such excesses may result in material separation and handling problems, and may even result in reduced recovery of hydrocarbon-based products. In one embodiment, the reducible manganese component or components, are substantially soluble in the liquid medium at the contacting conditions. Such substantially soluble manganese components are preferably selected from manganese (3+) ligand complexes, as described herein.

The contacting is preferably conducted in the present of at least one additional oxidant, preferably other than the oxygen transfer agent. The oxidant is present in an amount effective to do at least one of the following: maintain at least partially the promoting activity of the vanadium and/or iron and/or manganese component and/or the manganese (3+) complex; produce at least a portion of the oxygen transfer agent; and oxidize at least one component of the hydrocarbon-based material. Such oxidant is preferably selected so as to produce, or at least maintain, an effective amount of the oxygen transfer agent during the contacting. The oxidant or oxidants may be present during the contacting step and/or during a separate step to form and/or regenerate the vanadium and/or iron and/or manganese component, the manganese (3+) complex and/or the oxygen transfer agent.

Any suitable oxidant capable of performing one or more of the above-noted functions may be employed. The oxidant is preferably selected from the group consisting of molecular oxygen (e.g., in the form of air, dilute or enriched air, or other mixtures with nitrogen or carbon dioxide) singlet oxygen, ozone, inorganic oxidant components containing oxygen and at least one metal, preferably manganese, and mixtures thereof. More preferably, the oxidant is selected from the group consisting of molecular oxygen, oxidant components containing oxygen and at least one metal and mixtures thereof, especially molecular oxygen. A particularly useful oxidant comprises a mixture of molecular oxygen with carbon dioxide in an amount effective to promote the molecular oxygen access to and contact with the hydrocarbons. The use of carbon dioxide has been found to enhance the chemical modification, of the component or components of the hydrocarbon-based material. Although carbon dioxide may be used alone, i.e., substantially without an oxidant, it is preferably employed with an oxidant, and more preferably with molecular oxygen. When used with molecular oxygen, the carbon dioxide is preferably present in an amount in the range of about 0.1 to about 1000 moles of carbon dioxide per mole of molecular oxygen. Care should be exercised to avoid using carbon dioxide in amounts which substantially detrimentally affect the pH of the contacting liquid medium, reduce the pH of the liquid medium below the desired level for solubility useful for metal component hydrocarbon modification, e.g., oxidation, activity.

Large excesses of the oxidant should be avoided so that the hydrocarbon-based material is not unduly oxidized and destroyed. The amount of oxidant employed is preferably in the range of about 5 to about 150 of that needed to oxidize by one oxidation state the total amount of sulfur present in the hydrocarbon-based material fed to the present contacting step, or, in certain instances, of that needed to oxidize by one oxidation state the total amount of vanadium and/or iron and/or manganese component, and/or manganese 3+ ligand complex and/or oxygen transfer agent fed to the present contacting step.

Without wishing to be limited to any particular theory of operation, an illustrative example of the vanadium/oxygen transfer agent/oxidant embodiment of the present invention is believed to function as follows. The vanadium (5+) component acts directly on the component of the hydrocarbon-based material to be chemically, preferably oxidatively, modified. This interaction results in the vanadium species being reduced in oxidation state. The oxygen transfer agent, however, acts to oxidize this "reduced" vanadium to the 5+ oxidation state, and the oxidant oxidizes the resulting reduced oxygen transfer agent to the oxygen transfer agent. Such oxygen transfer agents, and in particular reducible manganese components, have been found to be effective in oxidizing the vanadium component to the 5+ oxidation state, while various other oxidants, such as molecular oxygen, are substantially ineffective in oxidizing the reduced vanadium component or components. However, molecular oxygen is effective to oxidize a reduced redox cyclable manganese component to a reducible manganese component and a reduced redox cyclable iron complex to an iron (3+) complex.

The vanadium (5+) complexes, iron (3+) complexes and manganese (3+) complexes useful in the present invention involve one or more ligands.

The presently useful metal complexes are preferably not fully complexed, for example, partial ligand complexes, i.e., not fully complexed at a ratio of ligand to metal which substantially reduces the redox cycling activity of the ligand complexes. This feature i.e., active redox cycling complexes, apparently facilitate the ability of the metal species to rapidly cycle between oxidation states and/or to promote the desired chemical modification, preferably oxidation, of the component of the hydrocarbons in the reservoir. With vanadium complexes, the mol ratio of vanadium to ligand is more preferably about 1 to about 3, still more preferably to about 2, with iron complexes the mol ratio of iron to ligand is more preferably about 1 to about 3, more preferably to about 2, and with manganese complexes the mol ratio of manganese to ligand is more preferably about 1 to about 2.0, still more preferably to about 1.5.

Any suitable ligand system may be employed. The ligands are preferably derived from the group consisting of compounds containing acetylacetonate functionality, carboxylic acid functionality (more preferably containing up to about 15 carbon atoms per molecule), poly, more preferably three, carboxylic acid functionalities, substituted carboxylic acid functionality (more preferably containing up to about 15 carbon atoms per molecule) poly, more preferably three, substituted carboxylic acid functionalities, polyoxyanious more preferably polyphosphate for example tripolyphosphate and mixtures thereof. Particularly useful ligand systems are derived from the group consisting of compounds containing acetylacetonate functionality, citric acid functionality, tartaric acid functionality, nitrilotriacetic acid functionality and mixtures thereof and their partial salts, and partial esters and substituted / derivatives thereof. Particularly preferred species are citric acid, tartaric acid and nitrilotriacetic acid and their partial salts and esters thereof as illustrated above.

Further examples of iron (3+) complexes useful in the present invention include iron complexes with polyfunctional amines, for example, ethylenediamine, propylene diamine, ethanol amine, glycine and asparagine and salts thereof; phosphonic acids and phosphonic acid salts, for example, ethane-1-hydroxy-l, 1-disphosphonic acid; pyridine and substituted, chelating pyridine, derivatives, for example, 1, 10-phenanthroline, 2, 2'-bipyridyl, glyoxine and salicylaldehyde derivatives; aguo; and $CN^-$. Among the particularly preferred iron complexing agents for use in the present invention are those selected from the group consisting of substituted, chelating derivatives of pyridine, aquo, $CN^-$ and mixtures thereof.

Especially suitable salt forms of ligands are the potassium, sodium and ammonium salts. Mixtures of ligands can be employed.

The specific amount of vanadium, iron and/or manganese component, oxygen transfer agent, and/or oxidant used to contact the hydrocarbon-based material is not narrowly critical to the present invention. However, such amount or amounts should be sufficient to perform the function or functions as described herein. The amount or amounts of one or more of these materials to be used depends on many factors, for example, the specific hydrocarbon-based material to be treated, and the type and degree of chemical modification desired. In certain applications, the amount of each of the vanadium, iron and/or manganese components and the reducible manganese component is in the range of about 0.005 to about 1% by weight (calculated as elemental metal) of the liquid medium. In the event such materials are substantially soluble in the liquid medium, each of them is preferably present in the liquid medium in an amount in the range of about 0.005% to about 0.5% by weight (calculated as elemental metal).

Any suitable liquid medium may be employed. Because of cost and availability considerations, it is preferred that the liquid medium be an aqueous liquid medium. The liquid medium may also include one or more components, e.g., basic materials, such as lime, sodium hydroxide, sodium orthosilicate, sodium carbonate and/or sodium bicarbonate, useful for controlling the pH of the liquid medium and/or for chemically reacting with one or more components of the hydrocarbon-based material.

The present contacting preferably takes place in the presence of an aqueous liquid medium, more preferably a slightly acidic or alkaline aqueous liquid medium. Any suitable aqueous liquid medium or composition may be employed in the present contacting step. The pH of the composition preferably is slightly acidic or alkaline and may vary depending, for example, on the specific hydrocarbon-based material being treated, and the makeup of the contacting composition. More preferably, when vanadium is employed, the pH of the aqueous liquid medium is in the range of about 6 to about 13. When iron 3+ is present, it is more preferred that the pH be in the range of about 6.5 to about 9.5, and when manganese 3+ is present it is more preferred that the pH be in the range of about 7.5 to about 10.5.

The pH of the aqueous liquid medium may be adjusted or maintained during the contacting step, for example, by adding one or more basic components to the aqueous liquid medium. Any suitable basic component or combination of such components may be included in, or added to, this medium to provide the desired basicity. For example, basic alkali metal and alkaline earth metal components, e.g., hydroxides, silicates, carbonates and bicarbonates, mixtures thereof and the like may be employed. Because of cost, availability and performance considerations, lime, sodium hydroxide, sodium carbonate, and mixtures thereof are preferred.

The aqueous liquid medium comprises water, preferably a major amount of water. This medium is preferably substantially free of ions and other entities which have a substantial detrimental effect on the present process. Quantity and concentration of the liquid aqueous medium may be selected in accordance with the requirements of any given hydrocarbon-based material to the treated and as may be found advantageous for any given mode of applying the process in practice.

The present contacting step preferably takes place at temperatures of less than about 300° C., more preferably at temperatures in the range of about 20° C. to about 200° C. The contacting pressure and contacting time may vary over wide ranges and are not narrowly critical to the present invention. Pressures in the range of about 5 psia or less to about 1000 psia or more may be employed. Satisfactory results are achieved at pressures in the range of about atmospheric to about 100 psia. and are preferred to minimize equipment requirements and costs. Contacting times may vary depending, for example, on the specific hydrocarbon-based material being treated, the specific metalcontaining and other, if any, components present during the contacting, and the type and degree of chemical modification desired. Contact times in the range of about 5 minutes or less to about 24 hours or more may be used. In certain embodiments, the contact time is preferably in the range of about 20 minutes to about 6 hours, more preferably about 0.5 hours to about 3 hours. During the contacting, agitation can be advantageously employed to enhance contacting. Mechanical mixers can be employed. Since the contacting can occur at ambient or moderately elevated temperatures, e.g., about 100° C. or less, processing can take place in a pipeline, or other transportation or storage ( e.g., storage tank) system in which the residence time of the hydrocarbon-based material is often measured in days, weeks or even months.

The contacting step may be carried out in any conventional manner, e.g., batchwise, semi-batchwise or continuously. Conventional equipment, such as stirred tanks, agitated or stirred autoclaves and the like, may be employed in performing the contacting step.

After the contacting step, the treated hydrocarbon-based material is recovered. For example, the treated hydrocarbon-based material may be separated, e.g., by settling, centrifugation and the like, from the liquid medium. In addition, other techniques, such as distillation, filtration and the like, can be employed to provide one or more refined hydrocarbon-based materials which can be used as is or can be subjected to further processing, e.g., catalytic processing, to produce even higher quality hydrocarbon-based products.

The following non-limiting examples illustrate certain of the advantages of the present invention.

EXAMPLES 1 TO 6

A quantity of heavy Alaskan North Slope crude oil was selected from bench scale testing.

Each experiment, including control Example 1, employed 50 ml of this crude oil (except Example 2, as noted below), 160 ml of an aqueous fraction and 80g of sand, in order to better approximate subterranean reservoir conditions. Each of the systems was agitated by a propeller stirrer in a tall and narrow glass container suspended in a water bath maintained at 50° C. 16 drops of a commercially available emulsifier was added to each system to aid in oil/water contacting. This emulsifier did not form any type of permanent emulsion. The conditions and results of each of these experiments are summarized as follows. EXAMPLE 1 (Control)

Conditions: 160 ml of pH 9–10 aqueous solution; 50 ml of crude oil; 80 g of sand; 50°C.; 3 days stirring.

Results: Upon termination of stirring, the oil/water layers separated within 30 seconds to one minute. Some solid (sand) remained in the water. However, no visible effect was apparent on the crude oil fraction.

EXAMPLE 2

Conditions: 160 ml of pH 6.5 solution; 40 ml of crude oil; 80g of sand; 4g of $MnO_2$; 3.2g of NaCl; 0.8g of $NH_4Cl$; 30°C.; slow air bubbling; 3 days stirring.

Results: Upon termination of stirring, there were no visible effects on the oil with this "$MnO_2$ only" system. Very fine $MnO_2$ particles were slow to settle, and some particles may have remained in the oil layer. Water/oil separation was very rapid, i.e., in a matter of minutes, with no differences from the control experiment (Example 1).

EXAMPLE 3

Conditions The aqueous fraction included 0.5% by weight of vanadium, as vanadium citrate (1.5 mol citrate:1 mol vanadium); 160 ml of pH 12 aqueous fraction; 7.4g of $MnO_2$; 50 ml of crude oil; 80g sand; 50°C.; 3 days stirring.

Results: Upon termination of stirring, an emulsion formed. The oil/water layers separated in 15–30 minutes, with small amounts of solid (sand, $MnO_2$) remaining in the oil layer.

EXAMPLE 4 Conditions: Same as Example 3, except that aqueous fraction also included 0.3% by weight of manganese, as manganese citrate (1.33 mol citrate:1 mol manganese), and the pH was reduced to 9.

Results: Upon termination of stirring, an emulsion formed. The oil/water layers separated in 1 to 1.5 hours, with small amounts of solid (sand, $MnO_2$) remaining in the oil layer. The aqueous layer was brown in color indicative of $Mn^{3+}$(citrate). There appeared to have been more emulsion formation that was apparent in Example 3.

EXAMPLE 5

Conditions Same as Example 4, except that air was introduced via very slow bubbling (one bubble every 3–5 seconds), and this experiment was run for 7 days.

Results: Upon termination of stirring, an emulsion formed. The oil/water layers separated in 1.5 to 2 hours, with small amounts of solid (sand, $MnO_2$ remaining in the oil layer. After separation, the oil layer appeared to be larger than it was originally, indicating that some type of permanent emulsion had been formed. The formation of oil emulsions makes hydrocarbons in subterranean reservoirs more susceptible to being recovered. Without wishing to be limited to any particular theory of operation, the small amount of air introduced in this run may have been beneficial in keeping the manganese in the 3+oxidation state, which manganese 3+it is believed was able to regenerate vanadium 5+(citrate) without any involvement from the $MnO_2$.

EXAMPLE 6

Conditions: Same as Example 5, except that the experiment was run for 3 days.

Results: After termination of stirring, an emulsion formed. The oil/water layers separated in 1.5 to 2 hours, with some solid (sand, $MnO_2$) remaining in the oil layer. As in Example 5, the oil layer appeared to have the characteristics of some type of permanent emulsion.

These examples show that the combination of vanadium and manganese, particularly such metals partially complexed with ands, an oxygen transfer agent such as $MnO_2$, and an oxidant such as air, is effective to provide chemical modification of petroleum. Note that Examples 1 and 2, with none of the presently useful materials, showed little or no effect on the crude oil.

While this invention has been described with respect to various specific examples and embodiments, it is to be understood that the invention is not limited thereto and that it can be variously practiced within the scope of the following claims.

What is claimed is:

1. A process for treating a petroleum hydrocarbon material comprising:

contacting said petroleum hydrocarbon material in the presence of an aqueous liquid medium with at least one metal component selected from the group consisting of vanadium components in which vanadium is present in the 5+ oxidation state in an amount effective to promote the oxidation of at least one component of said petroleum hydrocarbon material and which vanadium components are present in said aqueous liquid medium at said contacting conditions, iron (3+) ligand complexes in which iron is present in the 3+ oxidation state in an amount effective to promote the oxidation of at least one component of said petroleum hydrocarbon material and which iron (3+) ligand complexes are present in said aqueous liquid medium at said contacting conditions, manganese components in which manganese is present in the 3+ oxidation state in an amount effective to promote the oxidation of at least one component of said petroleum hydrocarbon material and mixtures thereof, and at least one oxygen transfer agent in an amount effective to do at least one of the following: maintain at least partially the promoting activity of said metal component; produce at least a portion of said metal component; and oxidize at least a portion of said component of said petroleum hydrocarbon material, said contacting occurring at conditions effective to oxidize said component of said petroleum hydrocarbon material and produce a petroleum hydrocarbon product.

2. The process of claim 1 wherein said oxygen transfer agent is present in an amount effective to maintain at least partially the promoting activity of said metal component.

3. The process of claim 1 wherein said metal component comprises a mixture of at least one of said vanadium components and at least one of said manganese components, provided that said manganese component is present in said aqueous liquid medium at said contacting conditions.

4. The process of claim 3 wherein said metal component is substantially soluble in said aqueous liquid medium at said contacting conditions.

5. The process of claim 1 wherein said oxygen transfer agent is a reducible manganese component.

6. The process of claim 1 wherein said oxygen transfer agent is present in an aqueous liquid medium during said contacting and is substantially soluble in said aqueous medium at said contacting conditions.

7. The process of claim 5 wherein said reducible manganese component is selected from the group consisting of manganese 3+ components, manganese 4+ components and mixtures thereof.

8. The process of claim 5 wherein said reducible manganese component is manganese dioxide.

9. The process of claim 5 wherein said reducible manganese component includes at least one manganese (3+) ligand complex.

10. The process of claim 9 wherein said manganese (3+) ligand complex is a partial ligand complex.

11. The process of claim 9 wherein said manganese (3+) ligand complex has a mol ratio of manganese to ligand in the range of about 1 to about 1.5.

12. The process of claim 1 wherein said vanadium component includes at least one vanadium (5+) ligand complex.

13. The process of claim 12 wherein said vanadium 5+ligand complex and said iron 3+ligand complex are partial ligand complexes.

14. The process of claim 9 wherein said vanadium component includes at least one vanadium (5+) ligand complex.

15. The process of claim 12 wherein at least one of said vanadium (5+) complex and said iron (3+) complex includes a ligand derived from the group consisting of compounds having acetylacetonate functionality, carboxcylic acid functionalities, substituted carboxcylic acid functionalities and mixtures thereof.

16. The process of claim 14 wherein at least one of said vanadium (5+) complex, said iron (3+) complex and said manganese (3+) complex include a ligand derived from the group consisting of compounds having acetylacetonate functionality, carboxcylic acid functionalities, substituted carboxcylic acid functionalities and mixtures thereof.

17. The process of claim 15 wherein said compounds having carboxylic acid functionalities or substituted carboxylic acid functionalities include up to about 15 carbon atoms per molecule.

18. The process of claim 16 wherein said compounds having carboxylic acid functionalities or substituted carboxylic acid functionalities include up to about 15 carbon atoms per molecule.

19. The process of claim 12 wherein at least on of said vanadium (5+) complex and said iron (3+) complex includes a ligand derived from the group consisting of compounds having acetylacetonate functionality, citric acid functionality, tartaric acid functionality, nitrilotriacetic acid functionality and mixtures thereof.

20. The process of claim 14 wherein at least one of said vanadium (5+) complex, said iron (3+) complex and said manganese (3+) complex include a ligand derived from the group consisting of compounds having acetylacetonate functionality, citric acid functionality, tartaric acid functionality, nitrilotriacetic acid functionality and mixtures thereof.

21. The process of claim 9 wherein said manganese (3+) ligand complex includes a ligand derived from the group consisting of compounds having acetylacetonate functionality, citric acid functionality, tartaric acid functionality, nitrilotriacetic acid functionality and mixtures thereof.

22. The process of claim 13 wherein said vanadium (5+) complex has a mol ratio of vanadium to ligand in the range of about 1 to about 2; and said iron (3+) complex has a mol ratio of iron to ligand in the range of about 1 to about 2.

23. The process of claim 14 wherein said vanadium (5+) complex has a mol ratio of vanadium to ligand in the range of about 1 to about 2; said iron (3+) complex has a mol ratio of iron to ligand in the range of about 1 to about 2; and said manganese (3+) complex has a mol ratio of manganese to ligand of about 1 to about 1.5.

24. The process of claim 1 wherein said metal component is at least one of said vanadium components, and said contacting occurs at a pH in the range of about 3 to about 13.

25. The process of claim 1 wherein said metal component is at least one of said vanadium components and said contacting occurs at a pH in the range of about 7 to about 13.

26. The process of claim 1 wherein said metal component is at least one of said iron (3+) ligand complexes and said contacting occurs at an alkaline pH.

27. The process of claim 1 wherein said metal component is at least one of said iron (3+) ligand complexes and said contacting occurs at a pH in the range of about 6.5 to about 9.5.

28. The process of claim 26 wherein iron (3+) said ligand complex includes at least one ligand derived from an iron complexing agent selected from the group consisting of poly-functional amines and salts thereof, phosphoric acids and salts thereof, pyridine and substituted, chelating pyridine derivatives, glyoxine and salicylaldehyde derivatives, condensed phosphates and mixtures thereof.

29. The process of claim 1 wherein said contacting occurs in the presence of an oxidant other than said metal component and said oxygen transfer agent, said oxidant being present in an amount effective to do at least one of the following: maintain at least partially the promoting activity of said metal components; produce at least a portion of said oxygen transfer agent; and oxidize at least a portion of said component of said petroleum hydrocarbon material.

30. The process of claim 29 wherein said oxidant is an oxygen-containing component.

31. The process of claim 29 wherein said oxidant is molecular oxygen.

32. The process of claim 1 wherein said contacting occurs in a transportation system or storage system for said petroleum hydrocarbon material.

33. The process of claim 1 wherein said contacting occurs in a transportation pipeline for said petroleum hydrocarbon material.

34. A process for treating a petroleum hydrocarbon material comprising:

contacting said petroleum hydrocarbon material with at least one manganese (3+) ligand complex in an amount effective to promote the oxidation of at least one component of said petroleum hydrocarbon material, said contacting occurring at conditions effective to oxidize said component of said petroleum hydrocarbon material and produce a petroleum hydrocarbon product, said contacting occurring in the presence of an oxidant other than said manganese (3+) ligand complex said oxidant being present in an amount effective to do at least one of the following: maintain at least partially the promoting activity of said manganese (3+) ligand complex; produce at least a portion of said manganese (3+) ligand complex; and oxidize at least a portion of said component of said petroleum hydrocarbon material.

35. The process of claim 34 wherein said manganese 3+) ligand complex is present in an aqueous liquid medium during said contacting.

36. The process of claim 35 wherein said manganese (3+) ligand complex is substantially soluble in said aqueous liquid medium at said contacting conditions.

37. The process of claim 34 wherein said manganese (3+) ligand complex is a partial ligand complex.

38. The process of claim 34 wherein said manganese (3+) ligand complex has a mol ratio of manganese to ligand in the range of about 1 to about 1.5.

39. The process of claim 34 wherein said manganese (3+) ligand complex includes a ligand derived from the group consisting of compounds having acetylacetonate functionality, carboxylic acid functionalities, substituted carboxylic acid functionalities and mixtures thereof.

40. The process of claim 39 wherein said compounds having carboxylic acid functionalities or substituted carboxylic acid functionalities include up to about 15 carbon atoms per molecule.

41. The process of claim 34 wherein said manganese (3+) ligand complex includes a ligand derived from the group consisting of compounds having acetylacetonate functionality, citric acid functionality, tartaric acid functionality, nitrilotriacetic acid functionality and mixtures thereof.

42. The process of claim 34 wherein said contacting occurs in the presence of at least one oxygen transfer agent in an amount effective to do at least one of the following: maintain at least partially the promoting activity of said manganese (3+) ligand complex; produce at least a portion of said manganese (3+) ligand complex; and oxidize at least a portion of said component of said petroleum hydrocarbon material.

43. The process of claim 42 wherein said oxygen transfer agent is a reducible manganese component.

44. The process of claim 42 wherein said oxygen transfer agent is manganese dioxide.

45. The process of claim 34 wherein said contacting occurs at a pH in the range of about 7.5 to about 10.5.

46. The process of claim 34 wherein said oxidant is an oxygen-containing component.

47. The process of claim 34 wherein said oxidant is molecular oxygen.

48. The process of claim 34 wherein said contacting occurs in a transportation system or storage system for said petroleum hydrocarbon material.

49. The process of claim 34 wherein said contacting occurs in a transportation pipeline for said petroleum hydrocarbon material.

* * * * *

UNITED STATES PATENT AND TRADEMARK OFFICE
CERTIFICATE OF CORRECTION

PATENT NO. : 4,946,578

DATED : August 7, 1990

INVENTOR(S) : Clough et al

It is certified that error appears in the above-identified patent and that said Letters Patent is hereby corrected as shown below:

Column 2, line 7, omit "petroleum hydrocarbon material."

Column 3, line 14, delete "hydrocarbonbased" and insert in place thereof --hydrocarbon-based--

Column 6, line 15, delete "5to about 150of" and insert in place thereof --5% to about 150% of--

Column 7, line 25, delete "chelating pyrdine," and insert in place thereof --chelating pyridine--

Column 9, line 66, delete "$Mn^3+$" and insert in place thereof --$Mn^{3+}$--

Column 10, line 34, delete "ands" and insert in place thereof --ligands--

Column 12, line 50, delete "iron (3+) said" and insert in place thereof --said iron (3+)--

Column 13, line 20, delete "complex" and insert in place thereof --complex,--

Signed and Sealed this

Nineteenth Day of November, 1991

Attest:

HARRY F. MANBECK, JR.

*Attesting Officer*     *Commissioner of Patents and Trademarks*